E. E. ROSE.
ELECTRICALLY HEATED APPARATUS.
APPLICATION FILED FEB. 7, 1913.
1,113,487.
Patented Oct. 13, 1914.
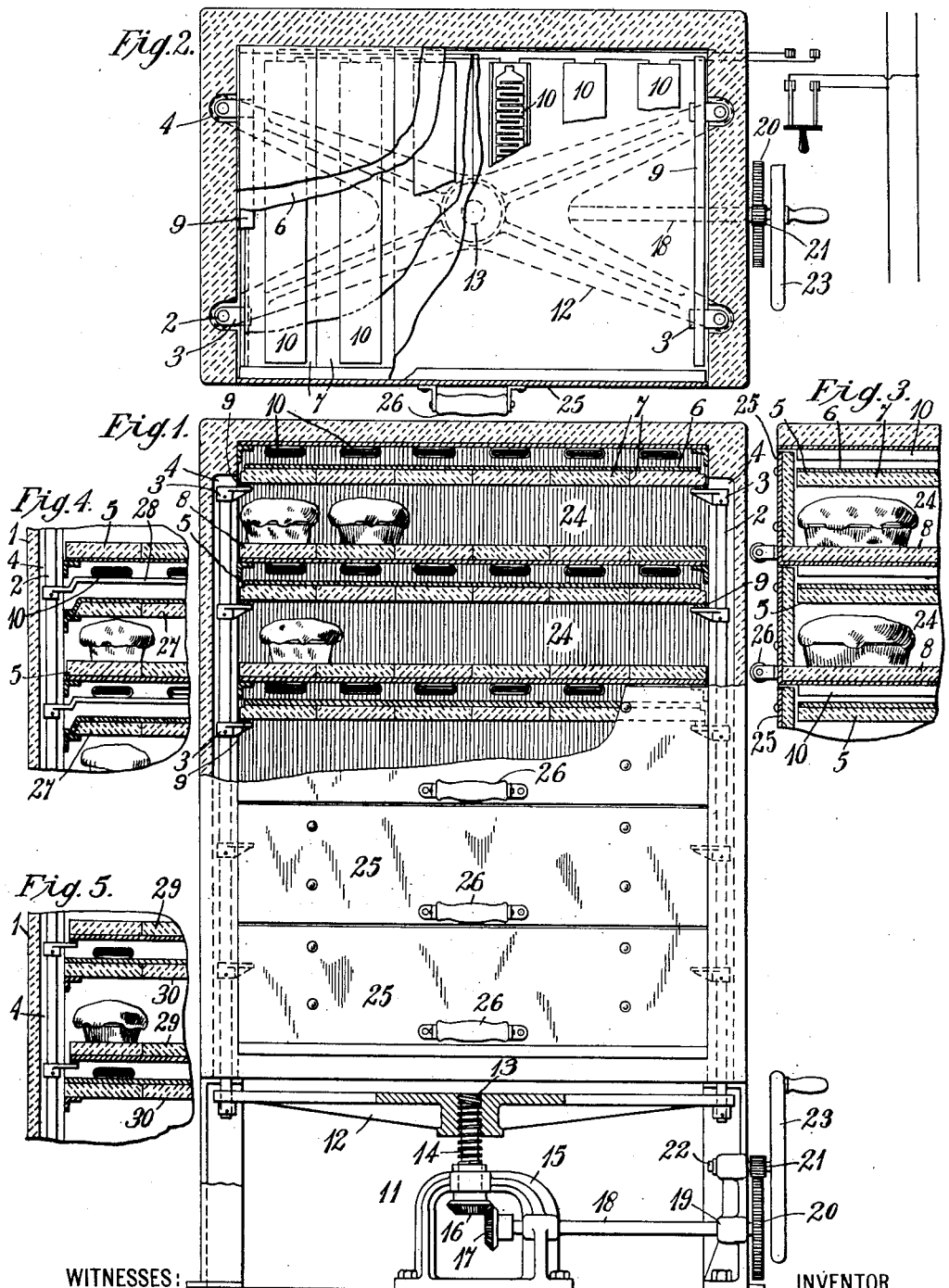
WITNESSES:
Thos. H. Miller
W. R. Coley
INVENTOR
Edward E. Rose
BY
Wesley G. Carr
ATTORNEY

UNITED STATES PATENT OFFICE.

EDWARD E. ROSE, OF SWISSVALE, PENNSYLVANIA, ASSIGNOR TO WESTINGHOUSE ELECTRIC AND MANUFACTURING COMPANY, A CORPORATION OF PENNSYLVANIA.

ELECTRICALLY-HEATED APPARATUS.

1,113,487.  Specification of Letters Patent.  Patented Oct. 13, 1914.

Application filed February 7, 1913. Serial No. 746,778.

*To all whom it may concern:*

Be it known that I, EDWARD E. ROSE, a citizen of the United States, and a resident of Swissvale, in the county of Allegheny and State of Pennsylvania, have invented a new and useful Improvement in Electrically-Heated Apparatus, of which the following is a specification.

My invention relates to electrically heated apparatus and it has special reference to bake ovens adapted to be heated by electricity.

The object of my invention is to provide a quick-acting and reliably operative electrical bake oven of large capacity which is capable of ready adjustment of the heat distribution over the various heating surfaces.

Heretofore, practically all electrical bake ovens have been constructed either on the plan of having one large heating unit from which the heat was distributed by convection or else on the theory of changing the size of the single heating compartment to obtain the desired heat regulation. It is also old in the art to provide electrical heaters with a plurality of separate sections which could be cut in or out of the circuit for supplying varying degrees of heat to the different portions of a baking compartment. However, this afforded merely a certain number of steps, and regulation between these fixed steps was impossible. With my invention, an absolutely continuous range of temperature gradations is possible, so that an exact scientific distribution of heat and not merely an approximation may be obtained.

According to one modification of my present invention, I propose to construct a bake oven which shall have a plurality of stationary and adjacent movable shelves, with a set of several heaters disposed between each pair of shelves. The adjustment of the distribution of heat to the several upper and lower portions of the compartments formed by the shelves is accomplished by causing the pairs of shelves to approach or recede from each other. In this way, the movable shelves are positioned at a proper distance from the heating units to give the desired apportionments of the radiated heat.

In the accompanying drawings, Figure 1 is a front elevation, partially in section, of my proposed oven; Fig. 2 is a top plan view of the same, with parts broken away, showing the interior construction and also giving a schematic diagram of electrical connections for the heater elements; Fig. 3 is a vertical section of a portion of the oven; Fig. 4 is a sectional view of a modification of my invention, wherein the heater units, as a unitary structure, are movable and all of the shelves are made stationary; and Fig. 5 is a sectional view of a further modification, wherein the upper shelf carrying the material to be baked is movable, and the lower shelf and heater units are made stationary.

Referring to the drawings, my invention embodies containing-walls 1 inclosing a plurality of pairs of adjacent shelves 5 and 8, one set of which is stationary and the other movable. Interposed between the shelves 5 and 8 are a plurality of electric heaters 10, heat regulation being obtained in the oven by adjusting the relative positions of said heaters 10 and movable shelves 5.

Walls 1 are composed of some heat-insulating material, such as infusorial earth or a pulverized asbestos mixture. Movable rods 2, provided with spaced inwardly-projecting lugs 3, are disposed within recesses 4 in side walls 1. The lugs 3 act as supports for the series of movable shelves 5, that severally consist of a heat-conducting plate 6, and a plurality of heat-storing slabs 7, such as tile or soap-stone. Stationary shelves 8 are similarly composed, and are supported by angle irons 9. Plates 6 on the two sets of shelves are adjacently disposed, and between them a plurality of electric heating units 10, preferably of the "bayonet" type, are installed. The heating units 10 are secured in any suitable manner as by means of clamps, to the plates 6. All the shelves may be readily removed, when it is so desired. It is understood that the structure of the said shelves 5 and 8, and of said heaters 10, need not be limited to the specific details herein mentioned, but may be of any other well known type.

The rods 2 and the associated shelves 5 may be raised and lowered as desired by means of mechanism 11 shown in Fig. 1. The mechanism embodies a base 12, to which the movable rods 2 are attached, and which is provided with a threaded central recess 13. One end of a jack-screw 14, having a bearing support in a pedestal 15, engages said threaded recess, a bevel gear wheel 16 being attached to the other end. A second bevel gear wheel 17 upon a shaft 18, which is likewise supported in a bearing in pedestal 15, meshes with gear 16. Shaft 18 extends through a second bearing in a pedestal 19 that is disposed near the front of the oven. A spur gear wheel 20 is attached to the outer end of shaft 18, and a pinion 21 meshes with said gear wheel. Pinion shaft 22 is supported in a bearing in pedestal 19, and a suitable hand wheel 23 for rotating said shaft and consequently raising or lowering the movable shelves 5, is attached to the outer end of said shaft. It is to be understood that other forms of hoisting mechanism may equally well be employed.

The amounts of heat severally delivered to the top and bottom of the baking compartments 24, formed by said shelves 5 and 8, are regulated by adjusting the positions of the movable shelves 5 with respect to said heaters 10 and also by altering the input to the heaters. It is evident that the amount of heat taken from each set of heaters 10 by the adjacent movable shelf 5 is inversely proportional to the distance between said set and said shelf, by reason of the heat-insulating properties of the air between them.

It is a fact well known to the art that different culinary products require different degrees of heat at divers sections throughout their mass. Rye bread and cake, for instance, must be furnished with a different heat distribution from white bread, and likewise different from each other. This requirement is satisfactorily met by the finely graded adjustment of heat distribution which is a property of my oven, that is, giving a different amount of heat to either the top or bottom of the product of the oven.

Each compartment 24 is furnished with a door 25 provided with a handle 26.

In Fig. 4, all the shelves 5 and 27 are made stationary. The heaters 10 are disposed upon plates 28 which are attached to the movable rods 2. By adjusting the position of the heaters 10, the distribution of heat to the top and bottom of bakng compartments 24 may be regulated, as hereinbefore described.

In Fig. 5, upper shelves 29 are disposed upon lugs 3 attached to rods 2, thereby being adjustable in position. Lower shelves 30 are made stationary and the sets of heaters 10 are severally disposed upon the upper surfaces thereof. The operation of the oven is identical with that hereinbefore described.

I do not wish to be restricted to the specific details herein set forth, but desire that only such limitations shall be imposed as are indicated in the appended claims.

I claim as my invention:

1. In an electric heating apparatus, the combination with a plurality of supporting members and a plurality of electric heating units disposed adjacent thereto, of means for varying the heat distribution on either side of said members.

2. In an electric oven, the combination with a plurality of shelves and a plurality of electric heating units disposed between of said shelves and adjacent thereto, of means for effecting a selective variation of heat on either side of said shelves.

3. In an electric oven, the combination with a plurality of pairs of shelves and a plurality of electric heating units interposed between each pair of shelves, of adjustable means for effecting a selective variation of heat on either side of said pairs of shelves.

4. In an electric heating apparatus, the combination with a plurality of supporting members and a plurality of electric heating units disposed adjacent thereto, of means for effecting relative movement between and suporting members and said heating units for regulating the amounts of heat delivered to the several supporting members.

5. In an electric oven, the combination with a plurality of shelves and a plurality of electric heating units disposed between said shelves and adjacent thereto, of means for effecting relative movement between said shelves and said heating units for regulating the amounts of heat delivered to the several shelves.

6. In an electric oven, the combination with a plurality of stationary shelves and a plurality of electric heating units associated therewith, of a plurality of movable shelves severally disposed adjacent to said stationary shelves and adapted to move relative to said heating units for varying the heat distribution in portions of the oven adjacent to said shelves.

7. In an electric oven, the combination with a plurality of stationary heat-storing shelves and a plurality of electric heating units disposed adjacent thereto, of a plurality of movable heat-storing shelves severally disposed adjacent to said stationary shelves and adapted to be finely adjustable in position relative to said heating units for varying the heat distribution in portions of the oven adjacent to said shelves.

8. In an electric oven, the combination with a plurality of removable heat-storing stationary shelves, of a plurality of similar movable shelves severally adjacent thereto, a plurality of electric heating units interposed between each pair of shelves, and means for adjusting the position of said movable shelves relative to said heating units for regulating the heat distribution in portions of the oven adjacent to said pairs of shelves.

9. In an electric oven, the combination with a plurality of removable heat-storing stationary shelves, of a plurality of similar movable shelves severally adjacent thereto, a plurality of sets of electric heating units interposed between each pair of shelves, being assembled in proximity to said stationary shelves, and adjusting mechanism for effecting movement of said movable shelves for regulating the heat distribution in portions of the oven adjacent to said pairs of shelves.

10. In an electric oven, the combination with a plurality of pairs of stationary shelves, of a plurality of sets of electric heating units interposed between each pair of shelves, and means adapted to move said heaters, as a unitary structure, relative to said shelves for regulating the heat distribution in portions of the oven adjacent to said pairs of shelves.

11. In an electric oven, the combination with a plurality of pairs of spaced removable heat-storing stationary shelves, of a plurality of sets of movable electric heating units interposed between each pair of said shelves, and adjusting mechanism for effecting movement of said movable heating units, as a unitary structure, relative to said shelves for regulating the heat distribution in portions of the oven adjacent to said pairs of shelves.

12. In an electric oven, the combination with a plurality of pairs of shelves, the several upper shelves being made stationary and the several lower shelves being movable with respect thereto, of a plurality of sets of electric heating units severally disposed upon the lower surfaces of the stationary upper shelves, and mechanism for effecting movement of said movable lower shelves for regulating the heat distribution in portions of the oven adjacent to said pairs of shelves.

13. In an electric oven, the combination with a plurality of pairs of shelves, the several lower shelves being made stationary and the several upper shelves being movable with respect thereto, of a plurality of sets of electric heating units severally disposed upon the upper surfaces of the stationary lower shelves, and mechanism for effecting movement of said movable upper shelves for regulating the heat distribution in portions of the oven adjacent to said pairs of shelves.

In testimony whereof, I have hereunto subscribed my name this 30th day of January, 1913.

EDWARD E. ROSE.

Witnesses:
  HERBERT E. RUGGLES,
  B. B. HINES.